April 7, 1964 J. V. JENKINSON 3,127,659

METHOD OF MANUFACTURING POINT CONTACT SEMICONDUCTOR DEVICES

Filed Nov. 4, 1960

INVENTOR.
JOHN V. JENKINSON
BY
Alfred H. Rosen
ATTORNEY 3,127,659
Patented Apr. 7, 1964

3,127,659

METHOD OF MANUFACTURING POINT CONTACT SEMICONDUCTOR DEVICES

John V. Jenkinson, Lexington, Mass., assignor to Microwave Associates, Inc., Burlington, Mass., a corporation of Massachusetts Filed Nov. 4, 1960, Ser. No. 67,294
5 Claims. (Cl. 29—25.3)

This invention relates to methods of manufacturing point contact semiconductor devices, and more particularly to the manufacture of such devices in which a glass housing is intimately bonded to and provides the sole structural member for holding the point contact element or elements in contact with the semiconductor body.

In point contact semiconductor devices according to the known art, a hollow housing which is spaced from the electrical elements furnishes the mechanical support which holds a catwhisker in contact with a semiconductor body. The housing is fabricated of many parts, and includes means for adjusting the catwhisker with relation to the semiconductor body during manufacture and for fixing the adjustment so that it will remain constant after manufacture. In addition to the thermal conditions which must be observed in selecting the materials for various parts of the housing, in order that temperature changes will not alter the contact of the catwhisker on the surface of the semiconductor body, such housings must be constructed so that they will not be prone to maladjustment due to vibrations to which one or another of the parts may be resonant at various frequencies, to which vibrations the semiconductor device may be subjected during storage and subsequent use. These problems have in many cases required the design of extremely complex housings involving the taking of special precautions in the design of the various parts, and therefore the processes of their manufacture have included large numbers of operations which have added to the cost and complexity of making them. Other problems which exist, in common with other types of semiconductor devices, are the problems of unnecessarily large size due to the provision of a housing which is spaced from the electrical elements, and problems of maintaining a hermetic seal among the various parts while observing all of the aforementioned precautions with respect to thermal and vibration conditions.

It is the principal object of the present invention to overcome and to eliminate as far as is possible the problems and attendant additional processing steps which are characteristic of point contact semiconductor devices employing multimember housings. It is another object of the invention to provide methods to manufacture an extremely rugged and rigid point contact semiconductor device in which the housing is of minimum size and simultaneously provides all the desired features of hermetic seal and mechanical support for the electrical elements, and in which the deleterious effects of thermal shock and mechanical shock are completely eliminated or reduced to an acceptable minimum. A further object is to provide a method to manufacture such an improved semiconductor device in which the processing steps are reduced to an absolute minimum and in which the control of the characteristics of the finished device is easily maintained throughout the processing steps.

According to the invention a point contact semiconductor device having a body of electronic semiconductor material and an elongated electrical conductor with one end pointed (i.e., a "catwhisker") is held in electrically rectifying contact with a surface of said body while it is provided with a housing made of glass which is in intimate contact with both the catwhisker and the semiconductor body in the vicinity of the region where these two elements are in contact with each other and for a distance away from this region. The glass is made of a frit which is applied in a suitable viscous binder to these elements while they are so held, and fired in place. The housing is thus fabricated in situ, and is intimately clad to both of these elements and, when completed, it simultaneously provides a hermetically sealed housing and a mechanical support for the elements. Preferably, the glass is made of a frit which melts and fuses into glass at a temperature sufficiently low to avoid damaging the devices during construction, and has a working temperature sufficiently high so that it does not soften during ambient temperatures encountered by the device in use. The glass housing thus formed maintains the rectifying contact between the two electrical elements during subsequent steps in the manufacture of the device and in the finished product.

A method of preparing such a device comprises steps in which a semiconductor body is mounted upon a thermal insulator and a catwhisker is brought into electrically rectifying contact with it and held in such contact while adjustment of the catwhisker contact on the semiconductor body is made until the desired operating characteristics are obtained. Thereafter, the glass frit, in an appropriate viscous vehicle, is applied to the surfaces of the body and the catwhisker adjacent the junction between the catwhisker and the semiconductor body and for a distance away from the junction on these surfaces. Then, heat is applied and the frit is fused into a glass after which the glass is allowed to cool and harden. During this process, electric contact is maintained separately with both the catwhisker and the semiconductor body so that the operating characteristics of the device can be observed during manufacture and the fabrication of an operative device assured.

Other and further objects and novel features of the method of the invention will become apparent from the following description of an embodiment thereof. This description refers to the accompanying drawings wherein:

FIGS. 1 and 2 show point contact semiconductor diodes which can be made by the method of the present invention, the novel structural features of which are described and claimed in the co-pending application of Arthur Uhlir, Jr., Serial No. 67,293, November 4, 1960 which was executed on the same day as the present application and is assigned to the same assignee.

Figures 1, 2, 3:
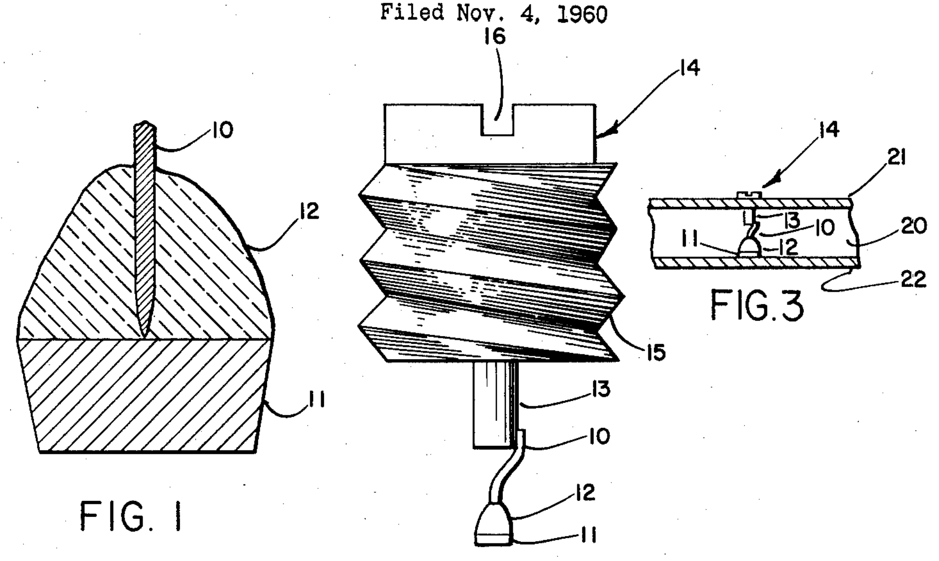
FIG. 1 illustrates in vertical section a point contact diode made by the method of the invention, magnified approximately fifty times normal size.
FIG. 2 shows a mounted diode in vertical elevation, magnified approximately 10 times normal size.
FIG. 3 shows a manner of using the point contact diode of FIGS. 1 and 2 in a waveguide.

Referring to FIG. 1 a semiconductor body 11, which may be of silicon, germanium, or other suitable electronic semiconductor material, has a point contact catwhisker 10, for example an elongated piece of tungsten 0.005 inch in diameter, and pointed at one end, in contact at its pointed end with a surface of the body 11, and a glass housing 12 fused to the surfaces of the catwhisker 10 and the semiconductor body 11 surrounding the region of said contact and for a distance away from said region. This is the entire device, and the glass housing 12 is simultaneously a rigid mechanical support for the electrical elements 10 and 11 and a hermetic seal for the rectifying point contact junction between them.

Referring to FIG. 2, the completed device comprising elements 10, 11 and 12 is mounted at the outer or free end of the catwhisker element 10 to an electrically conductive stud 13 which in turn is centrally mounted on a contact pin 14 externally threaded as at 15 and having for convenience a screw driver slot 16 to enable the contact pin to be threaded into a utilizing holder. It will be appreciated that the slotted head and threads are shown by way of example only, and that other means of mounting the contact pin 14 may be employed if desired. In practice the diameter of the contact pin 14 will be approximately one-eighth of an inch, FIG. 2 being drawn on an enlarged scale in order to illustrate structural details more easily.

In FIG. 3 a waveguide 20 having for example upper and lower wide walls 21 and 22 has the contact pin 14 threadedly engaged in the upper wall with the stud 13 projecting toward the lower wall 22. The lower surface of the semiconductor body 11, which is free of the housing is in contact with the inner surface of the lower wall 22, resting thereon in ohmic contact therewith. The bent portion of the catwhisker 10 serves as a spring holding the body 11 in contact with the wall 22.

Figure 4:
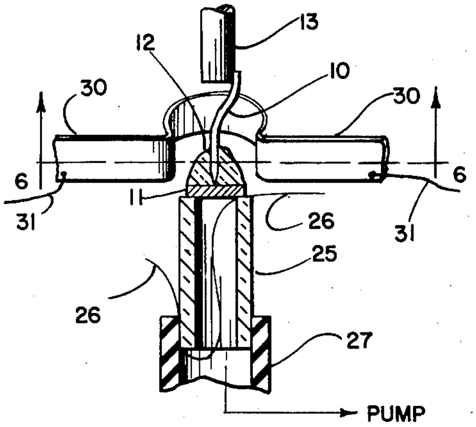
FIG. 4 illustrates a heating step in the method of manufacturing the glass housing of the diode of FIG. 1.
Figure 5:
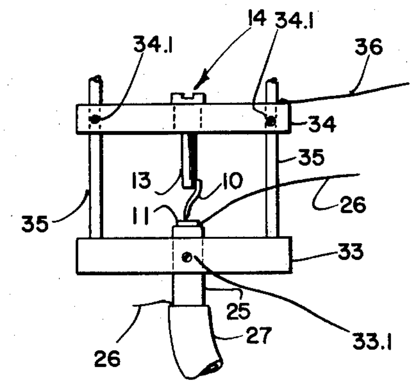
FIG. 5 illustrates a jig for holding the catwhisker and the semiconductor die during manufacture.
Figure 6:
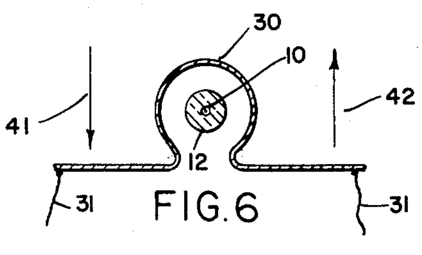
FIG. 6 is a section along line 6—6 of FIG. 4.

Referring to FIGS. 4, 5 and 6, and insulating thermally non-conductive tube 25, which may be of quartz, for example, has a wire 26 threaded through it and is mounted at its lower end in an insulating, for example, rubber, tube 27, which is connected to a vacuum pump (not shown). The semiconductor body 11 rests on the top end (as seen in FIG. 4) of the tube 25 and, when the vacuum pump (not shown) is energized, the body 11 is temporarily held firmly in this position. Referring particularly to FIG. 5, a jig comprising two supports 33 and 34 holds the tube 25 mounted in the lower support 33, for example, by a set screw 33.1, and a subassembly comprising the mounting pin 14, stud 13 and the catwhisker 10 mounted in the upper support 34. Posts 35 hold the lower and upper supports 33 and 34, respectively, of the jig a fixed distance apart. Set screws 34.1 in the upper support 34 can be used to establish this fixed distance. Those skilled in mechanical arts will recognize that, alternatively, the set screws 34.1 may be omitted, and a micrometer screw (not shown) can be fitted to the jig to set this fixed distance with greater precision, as desired. By one or the other of these adjustments of the upper support 34 relative to the lower support 33, an electrically rectifying contact between the catwhisker 10 and the semiconductor body 11 can be made and maintained. If a diode according to FIG. 1, without the mounting pin 14 and stud 13 preassembled to the catwhisker 10, is being made, the catwhisker 10 can be directly mounted in the upper support 34 (as by a set screw not shown). A wire 36 attached to the upper support 34 and the wire 26 in contact with the semiconductor body 11 are used for the purpose of supervising or monitoring the rectifying characteristics of the contact between elements 10 and 11 during manufacture. Supervision equipment for this purpose may be of any kind known to the art of manufacturing point contact devices, and is not illustrated herein.

With the catwhisker 10 and the semiconductor body 11 fixedly held with appropriate pressure at the rectifying contact between them, the frit which will constitute the housing 12 is applied in a suitable vehicle in the position it will occupy as the finished housing, as is shown more particularly in FIG. 4. A suitable frit and the manner of processing it will be described more particularly below.

A resistance heating coil 30 is then moved into position around the semiconductor body 11, catwhisker 10 and the frit and current is supplied through conductors 31 to heat the frit until it melts and forms the glass of the final housing 12. The heating coil 30 consists of a single turn of a suitable electrical resistance heater material, open at one side so that it can be moved in the direction of a first arrow 41 (FIG. 6) to bring it into a position surrounding the semiconductor device being fabricated, and thereafter moved in the opposite direction, indicated by a second arrow 42 to remove it from the vicinity of the semiconductor device. A suitable electrical resistance heater material is Nichrome ribbon ⅛" x 1/64" in cross section. I have obtained this material under the trademark and designation "Kanthol" A-1 grade Nichrome type ribbon. A single turn ⅛" in diameter, supplied with 60 c.p.s. alternating current from the commerical power lines is adequate to heat the frit to 775° C., at which temperature a suitable frit will melt, as is described below.

The use of an insulating tube 25 to hold the semiconductor body 11 provides that the heat thus applied will not be quickly conducted away so that only a small amount of heat need be used to complete the manufacture of the device. When the glass frit has fused into a glass body the heat is removed and the device is allowed to cool to solidify the glass. These steps yield a finished point contact diode as shown for example in FIGS. 1 and 2.

The glass frit and vehicle can be prepared in a usual manner to provide a viscous paste of any consistency suitable for brush or extrusion application. One usual manner is to mix the frit in finely divided condition (known as "glass solder") with a vehicle comprising quantities of nitrocellulose and amylacetate sufficient to form a paste. Upon heating to the firing temperature the amylacetate evaporates and the nitrocellulose burns off. The heating (sometimes called "firing") can be done in air.

When a silicon device is to be fabricated, a glass solder may be used which melts at a temperature in the range of approximately 700° C. to 775° C. and upon cooling provides a housing which cannot be melted at any temperature below approximately 600° C. A suitable glass solder for this purpose, which has been used to make a silicon point contact diode as shown in FIG. 1, was procured from Corning Glass Co., Corning, New York, under the designation "#7574 Hard Glass" also known as "Pyroceram" #45. A diode made with this glass solder had a silicon semiconductor body 11 and a catwhisker 10 made of tungsten 0.005 inch in diameter. This solder, in the form of a frit, was mixed in a binder of nitrocellulose and amylacetate, as described above, to form a paste of consistency suitable for brush application, and this paste was brushed on the surfaces of the catwhisker 10 and semiconductor body 11 at and around the point contact junction, in the form of a mass in the general shape of the desired housing 12. Heat was applied to raise the temperature of the body 11, catwhisker 10 and paste to about 750° C. to 775° C. until a glaze appeared on the paste indicating conversion of the paste to a vitreous glass. This particular glass has the characteristic that, upon further heating for about one hour at 750° C. it at least partially devitrifies. Either form may be used to fabricate a useful diode. Any glass which is serviceable (i.e., does not soften to the point where it flows) at the highest operating temperature or further processing temperature expected to be encountered can be used to make junction devices according to the invention. Thus, where the highest temperature expected to be encountered in use is about 200° C. a glass which is serviceable above this temperature is adequate for service use.

The catwhisker electrode 10 may be attached to utility electrode means, like the stud 13 and contact pin 14, prior to its assembly into a finished diode, if desired. This will enable the utility electrode means 13, 14 to be used to handle the catwhisker during the assembly operations, as is shown in FIG. 5. In such a case, the catwhisker is preferably welded to the stud. On the other hand, the catwhisker may be fabricated into a diode according to FIG. 1 prior to the attachment of a utility electrode means or such a device may be used without any further utility electrode. In such a case, the jig 33, 34, 35 can be modified to hold the catwhisker without the intervention of the utility electrode assembly 13, 14 as is mentioned above.

A glass of a housing 12 made of Pyroceram #45 has been found to be satisfactory. The vitreous form of this glass is serviceable up to 644° C. The devitrified form is serviceable up to 650° C.

As is mentioned above, glass solders which are fired and provide glass which become soft at temperatures below 600° C. may be used if desired. The practical embodiment of a finished diode which has been described is by way of example only.

The embodiments of the invention which have been illustrated and described herein are but a few illustrations of the invention. Other embodiments and modifications will occur to those skilled in the art. For example, owing to the small sizes of the semiconductor body 11 and catwhisker 10, the frit in paste form is of such small mass that it will adhere to these elements even if they are disposed on their sides (relative to FIG. 4), and the glass housing can be formed in a sidewise position as well as the vertical position of FIG. 4. This has been done in practice. Also the present invention is useful in the manufacture of other forms of point contact semiconductor devices, such as, but not limited to, the various embodiments of such devices which are described and claimed in the aforementioned copending application of Arthur Uhlir, Jr. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Method of fabricating a point-contact semiconductor device comprising the steps of:
   contacting a surface of a body of semiconductor material with the pointed end of an elongated electrical connector so as to form a rectifying contact;
   depositing on only a region of said surface surrounding and contiguous with said rectifying contact, and on a portion of said conductor near said end, a quantity of a viscous mixture of a glass frit and a vehicle therefor;
   heating said mixture so as to fuse it into a glass mass intimately bonded to said region and portion while maintaining said surface and end in said rectifying contact; and
   cooling said mass to a solid while maintaining said rectifying contact.

2. Method as defined in claim 1 wherein said mixture is heated to a range of between 700° C. and 775° C.

3. Method of fabricating a point-contact semiconductor device comprising the steps of:

contacting a surface of a body of semiconductor material with the pointed end of an elongated electrical connector so as to form a rectifying contact;
   depositing only on a region of said surface surrounding and contiguous with said rectifying contact, and on a portion of said conductor near said end, a quantity of a viscous mixture of a devitrifiable glass frit and a vehicle therefor;
   heating said mixture so as to fuse it into a glass mass intimately bonded to said surface and portion while maintaining said surface and end in said rectifying contact;
   continuing said heating until said glass mass at least partially devitrifies; and
   cooling said mass to a solid while maintaining said surface and said end in said rectifying contact.

4. Method as defined in claim 3 wherein said mixture is heated to a temperature within a range of 700° C. to 775° C.

5. Method of fabricating a point-contact semiconductor device comprising the steps of:
   mounting a body of electronic semiconductor material on a substantially thermally non-conductive support;
   attaching a first temporary electrical connection to said body;
   adjusting the pointed end of an elongated electrical conductor so as to provide an electrical rectifying contact between said pointed end and a surface of said body;
   attaching a second temporary electrical connection to said conductor;
   depositing only on a region of said surface surrounding and contiguous with said rectifying contact and on a portion of said electrode near said end a quantity of a viscous mixture of a glass frit and a vehicle therefor;
   heating said mixture so as to melt said frit and fuse it into a mass of at least partially devitrified glass intimately bonded to said surface and portion while maintaining said surface and end in said rectifying contact;
   cooling said mass while maintaining said rectifying contact; and
   monitoring the quality of said rectifying contact throughout fabrication of said device by measurement through said temporary electrical connections.

References Cited in the file of this patent

UNITED STATES PATENTS

| | | |
|---|---|---|
| 2,248,644 | Reger et al. | July 8, 1941 |
| 2,475,940 | Brittain | July 12, 1949 |
| 2,588,956 | Brittain et al. | Mar. 11, 1952 |
| 2,753,497 | Jenkins et al. | July 3, 1956 |
| 2,836,878 | Shepard | June 3, 1958 |
| 2,946,114 | Berg | July 26, 1960 |
| 2,964,831 | Peterson | Dec. 20, 1960 |